(12) United States Patent
Ellis et al.

(10) Patent No.: US 8,116,308 B2
(45) Date of Patent: Feb. 14, 2012

(54) SYSTEM AND METHOD FOR PROVIDING IMPROVED PACKET TRACEABILITY

(75) Inventors: Donald Ellis, Ottawa (CA); Allan Phillips, Whitinsville, MA (US); Gerald Smallegange, Sittsville (CA); Barry Davies, Kingston (CA)

(73) Assignee: Ciena Corporation, Linthicum, MD (US)

(*) Notice: Subject to any disclaimer, the term of this patent is extended or adjusted under 35 U.S.C. 154(b) by 722 days.

(21) Appl. No.: 11/758,140

(22) Filed: Jun. 5, 2007

(65) Prior Publication Data

US 2008/0275972 A1    Nov. 6, 2008

Related U.S. Application Data

(60) Provisional application No. 60/915,989, filed on May 4, 2007.

(51) Int. Cl.
*H04L 12/28* (2006.01)
(52) U.S. Cl. .................... 370/389; 370/352
(58) Field of Classification Search ............... None
See application file for complete search history.

(56) References Cited

U.S. PATENT DOCUMENTS

| | | | | |
|---|---|---|---|---|
| 5,687,224 A * | 11/1997 | Alley et al. | ............. | 379/201.12 |
| 6,377,793 B1 * | 4/2002 | Jenkins | ............. | 455/412.1 |
| 6,711,689 B2 * | 3/2004 | Lumme et al. | ............. | 726/22 |
| 7,096,030 B2 * | 8/2006 | Huomo | ............. | 455/456.3 |
| 7,110,362 B2 * | 9/2006 | Kato | ............. | 370/236.1 |
| 7,426,380 B2 * | 9/2008 | Hines et al. | ............. | 455/404.2 |
| 7,433,682 B1 * | 10/2008 | Moll et al. | ............. | 455/414.1 |
| 2004/0085951 A1 * | 5/2004 | Rezaiifar et al. | ............. | 370/352 |
| 2004/0190497 A1 * | 9/2004 | Knox | ............. | 370/352 |
| 2007/0177582 A1 * | 8/2007 | Croak et al. | ............. | 370/352 |
| 2007/0286204 A1 * | 12/2007 | Ould-Brahim | ............. | 370/395.5 |
| 2008/0205263 A1 * | 8/2008 | Cooley et al. | ............. | 370/218 |
| 2008/0291910 A1 * | 11/2008 | Tadimeti et al. | ............. | 370/389 |

OTHER PUBLICATIONS

IEEE Standard for Local and Metropolitan Area Networks—Virtual Bridged Local Area Networks, pp. 1-121 dated 2005.
IEEE Standard for Local and Metropolitan Area Networks—Virtual Bridged Local Area Networks, IEEE Std. 802.1ah (Mar. 2007).

* cited by examiner

*Primary Examiner* — Robert Wilson
(74) *Attorney, Agent, or Firm* — Christopher & Weisberg, P.A.

(57) ABSTRACT

A method and apparatus is described which enables location information associated with a client to easily be obtained by a service provider in a packet-based network. The location information may be the location of the client itself, or may be location information associated with devices in a communication facility established by the client. Location information associated with the client may be provided to services such as emergency services to facilitate fast dispatch of resources to assist the client. Location information associated with facilities of the client may be used to facilitate lawful interception of client communications. In one embodiment, the location information is obtained using information included in one of a Provider Backbone Bridge (PBB) or Provider Backbone Transport (PBT) packet.

22 Claims, 9 Drawing Sheets

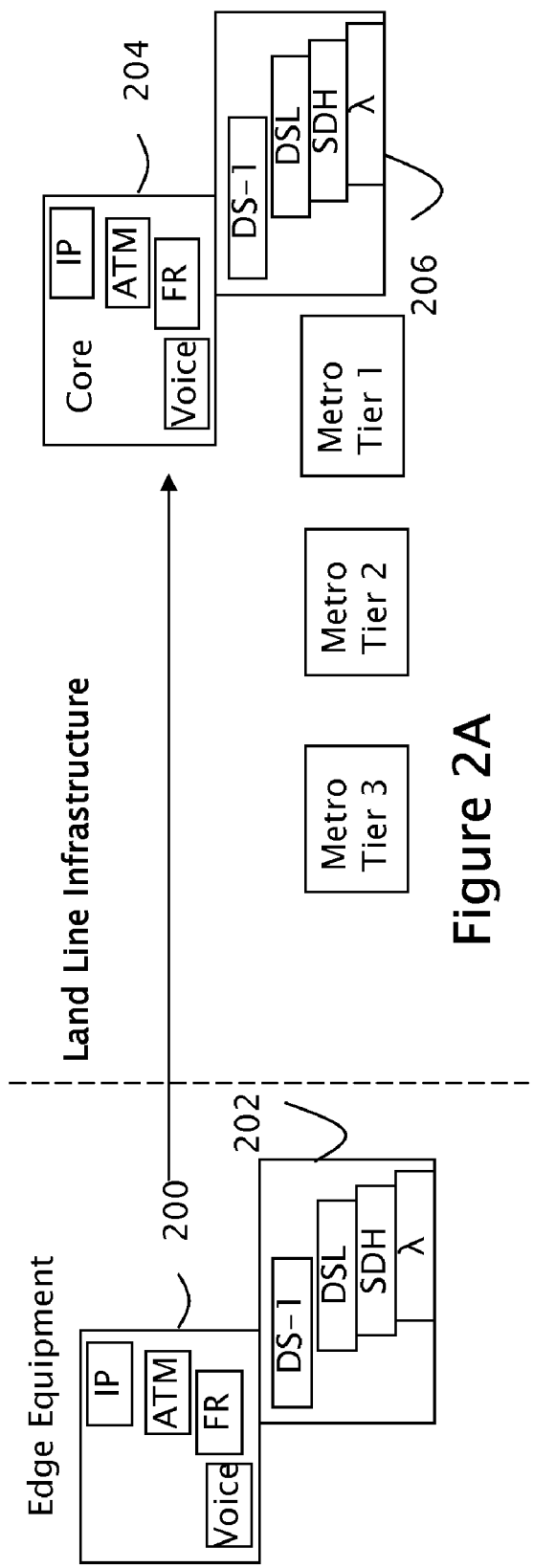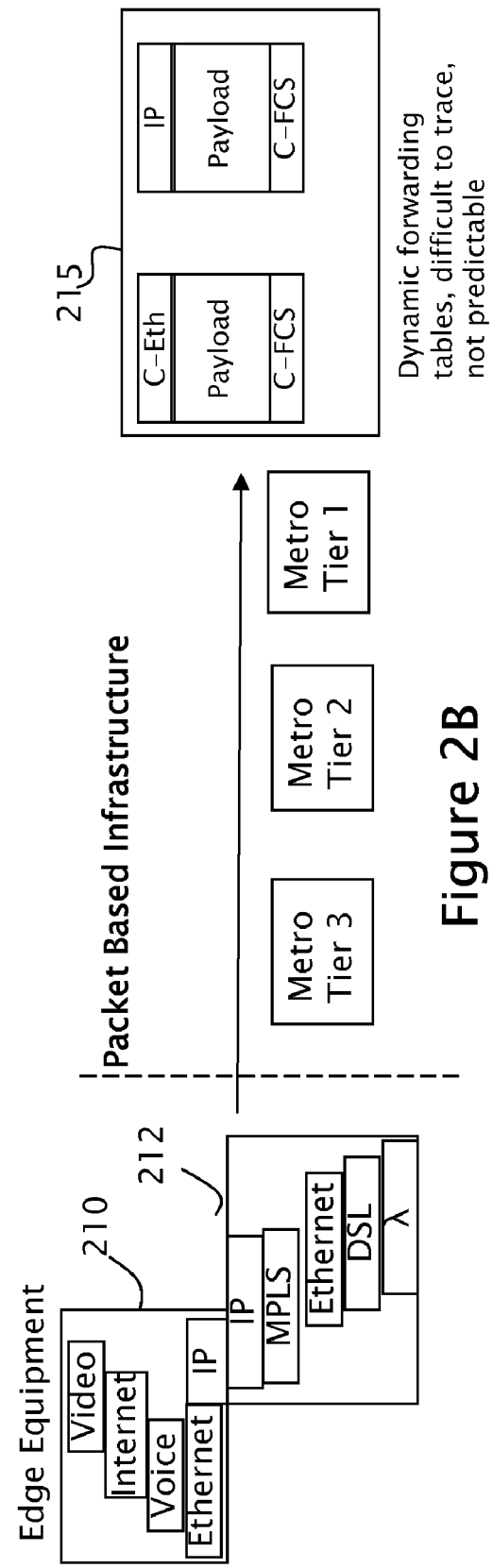
Figure 2A
Figure 2B

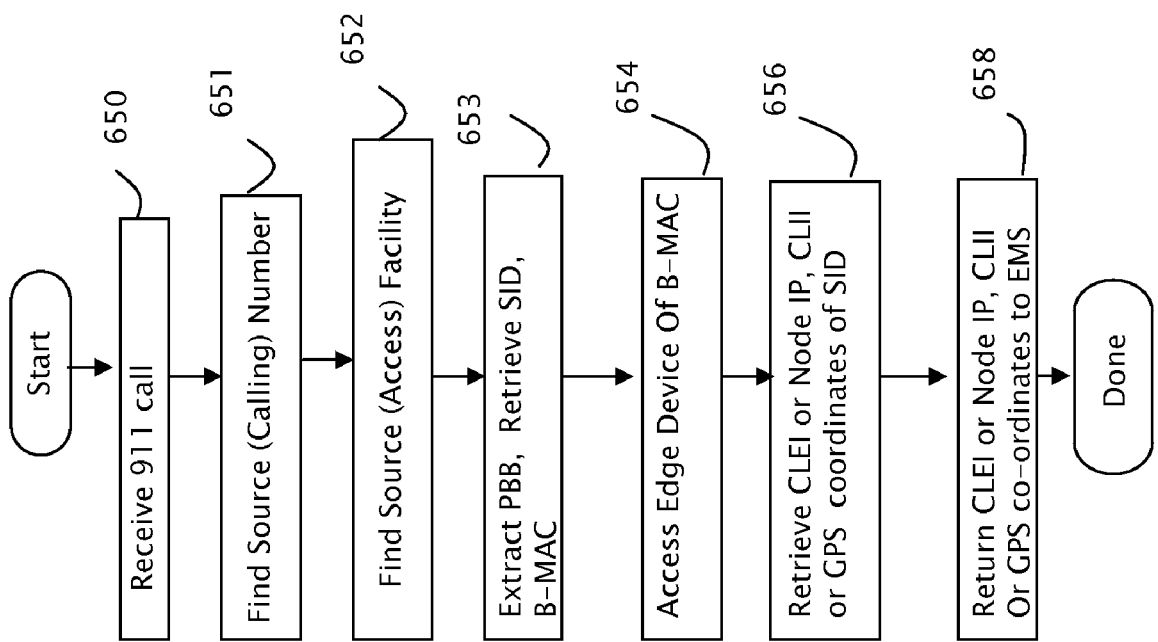

SYSTEM AND METHOD FOR PROVIDING IMPROVED PACKET TRACEABILITY

RELATED APPLICATIONS

This application claims priority under 35 U.S.C. §1.19(e) to provisional patent application Ser. No. 60/915,989 filed May 4, 2007 and incorporated herein by reference.

FIELD OF THE INVENTION

This invention relates generally to the packet based networks and more particularly to a system and method for improving packet traceability in a network including a packet-based infrastructure.

BACKGROUND OF THE INVENTION

Service Providers (SPs) generate contractually repeating revenues for the services delivered to their customers over a network. The network of a service provider includes a variety of core and edge network devices, where the core devices forward packets to only to core and edge devices in the network, and edge devices route packets between the core and other outside networks. Core devices are controlled by operating systems to route, monitor and analyze traffic to ensure that services are provided at their appropriate service levels.

Each SP supports a variety of network services, such as Domain Name Services (DNS), call services, Voice over IP, email, DHCP, etc. Network services may be provided via network trunk or tunnels across the SP network.

The underlying technology of the core and edge devices impacts the ability of the service provider to deliver services to customers. Conventional telecommunications service providers have used leased land-lines to provide circuit connectivity to customers. Circuit connectivity enables strong service level agreements to be supported because the end points and paths of the circuit are well defined. As customer demand for increased bandwidth and mobility at reduced cost has increased, however, the technology of the core and edge network resources continues to evolve in the direction of a packet-based infrastructure.

The evolution of technology towards a packet based infrastructure has challenged the service provider's ability to maintain the quality of services that is available in a circuit based network. One problem with packet-based infrastructures is the difficulty in tracing packets through a packet-based infrastructure. The decrease in packet traceability makes it difficult to pin point the location of the source of a communication packet at the core and the path which the packet takes through the infrastructure.

The ability to identify both the location of a source of a packet and the location of resources used by a client of the service provider is critical to emergency service and lawful intercept applications. Emergency services such as 911 and Enhanced 911 (E911) are designed to quickly link those requesting aid with resources capable of providing that aid. The location of the person requesting aid is required to enable service providers to identify and dispatch available resources. Lawful Intercept is a security process in which a network operator or service provider gives law enforcement officials access to the communications of private individuals or organizations. Lawful Intercept therefore requires the ability to identify the location of network resources used during communications by the client.

In traditional land-line based telecommunication infrastructures the location of a client and resources used by that client is readily available. Circuit-based infrastructure for traditional land-line phone service using Digital Signal-1 (DS-1) and Digital Signal-0 (DS-0) circuits is deterministic and has identifiers tied to the physical location of the circuit end-point. For example, referring now to FIG. 1 a circuit based network 100 such as that used in traditional digital land-line communications is shown to include a Service OSS 102 and a Network OSS 104. The Service OSS and Network OSS together map network resources to network connections to service the connections. Each OSS performs many network management tasks including inventory, provisioning system, performance monitoring system and a billing.

Customers of the service provider are assigned Common Language Location Identifiers (CLLI). The service provider uses client CLLIs to identify resources for building connections between the clients, and thus the CLLIs identify end-points of circuit connections. Service providers maintain tables that correlate end-points to circuits. Representative tables 22 and 24 are shown in FIG. 1. When a service order is received from a customer, the OSS translates the service order into a work order for the network OSS. The network OSS designs a circuit for the service, assigning network elements and interfaces to different aspects of the service, using an existing inventory. Network resources include Common Language Equipment Identifiers (CLEIs) which uniquely identify the network equipment. Each circuit therefore includes both CLLI information, identifying the endpoints, and CLEI information identifying resources that support the circuit. Endpoint information is stored in tables (such as table 22) for each circuit. For example table 22 stores the Network Element IDs and Interface IDs (IFIDs) [or Attachment IDs (AIDs)] for each endpoint. A table 24 of core elements that are traversed by the circuit (and the associated AID at each core) is also maintained.

The table at the edge and core allow the 911 operator to match a location and circuit together and enable E911 service. For example, when an emergency service request is initiated by a customer, the location of the customer can be readily obtained by using the customer ID to locate circuit IDs and CLEIs for the customer, rapidly pinpointing customer location. The database is relatively accurate, although intermittent updates of new addresses may result in database inaccuracies at various points in time. When it is desired to lawfully intercept communications of a user, all of the circuits associated with the user, as well as the equipment and interfaces used to form the circuit, can be easily identified and passed to law enforcement to allow them to select desired locations in the circuit for taps.

With the advent of packet infrastructure and the move away from circuits it has become more difficult to link a client packet and a location of origin. When emergency service requests are initiated via internet communication devices (such as cell phones, PDAs, and other wireless devices), via Internet communication services (such as Voice over IP), the location of the individual is difficult to obtain. One reason for this difficulty is that clients which communicate via the Internet use Internet Protocol (IP) addresses that are dynamically assigned (with DHCP); thus the address of a client may differ each time it connects to the internet. Many networks which implement protocols such as MPLS or stacked-VLAN (QinQ) networks swap header packets at each hop along the path from the user to the core network, and make tracing the path back to the user almost impossible. The difficulty in determining the location of origin of a packet frustrates a service provider's ability to provide emergency services with accuracy.

It is also difficult to associate network resources with communications of a particular client due to dynamic routing of packets in the IP infrastructure. Thus packets from a source may be routed over many possible routes to the same destination. The inability to identify the particular route associated with client communications complicates a service provider's ability to provide lawful intercept.

For example, FIGS. 2A and 2B illustrate respective information flow between edge devices and the core in respective traditional leased land-line infrastructures and packet based infrastructures. The communication includes both service related information 200 and network related information 202. The information may be in the form of headers. As shown in FIG. 2A, when a communication from an edge device in a traditional circuit based network maintains consistent information from the edge to the core. Thus communications at the core in a circuit based network will include service related information 204 as well as network related information 206.

FIG. 2B illustrates the flow of information between an edge device and the network core in a packet based telecommunications infrastructure. As shown in FIG. 2B, the network information 212 may not be preserved as it travels through the core; rather intermediate nodes may perform label swapping, dynamic routing and other header processing protocols which makes it difficult to track the origination of a packet 215 at the core.

In addition to the above problems associated with locating customers, clients of emergency services typically have to be routed through multiple service providers before gaining access to the 911 operator. With the nomadic nature of the mobile device user, an internet connection may be made from any location with internet access. Because the exact location where internet access is obtained by the client is not easily accessible location determinations are prone to error and response time is delayed. Emergency service requests have been routed to service providers which are geographically distant from the person in need and unable to provide timely, if any, assistance. Delays in response time and inaccuracy of address database poses significant problems when seeking to provide accurate and timely E911 services. It is therefore desirable to identify a system for quickly ascertaining the location of clients communicating with an emergency service via the internet. It is further desirable to identify a system which would permit the location of network resources that are used by a client for communication to be identified for lawful intercept purposes.

SUMMARY OF THE INVENTION

The present invention is directed towards a system and method for providing location information to services executing in a packet based infrastructure. The location information includes client location information for identifying a source of a packet at the core, and resource location information for identifying resources used for client communication.

According to one aspect of the invention a method of determining a location of a client requesting a service includes the steps of receiving a service request, the service request comprising a header, the header comprising an address of an edge node associated with the client and a service identifier associated with the client and retrieving location information for the client from the edge node associated with the address using the service identifier and the end point tunnel identifier. In one embodiment, the header is one of either a Provider Backbone Bridge (PBB) or Provider Backbone Transport (PBB-TE) header and the service identifier associates and interface of the edge device with the client to provide location information for the client. The location and end point tunnel information is returned to the service provider to permit the service provider to provide the service in accordance with the client's location. For example, with such an arrangement a client location may be readily identified to assist the delivery of emergency services.

According to another aspect of the invention, a method of identifying network devices that are associated with client communications in a packet-based network includes the steps of receiving a request to monitor communications of a client, identifying at least one service identifier associated with the client, identifying at least one tunnel associated with the service identifier, and monitoring a plurality of network devices to detect a traversal of at least one tunnel through the plurality of network devices including identifying a set of network devices traversed by the tunnel. Such an arrangement enables lawful interception tap points to be identified in packet-based networks.

BRIEF DESCRIPTION OF THE FIGURES

FIGS. 2A and 2B illustrate communication flow between an edge device and a core device in respective circuit based and packet based network infrastructures;

FIGS. 6A and 6B are respective block and flow diagrams provided to illustrate steps and information flow during location of a client in response to an emergency service request.

DETAILED DESCRIPTION

The present invention is directed towards a system and method for providing location information to services executing in a packet based infrastructure. The location information includes client location information for identifying a source of a packet at the core, and resource location information for identifying resources used for client communication. Any service that requires information to locate and track a client or client associated equipment may benefit from the use of the present invention. Therefore, although services such as 911, enhanced 911 and lawful intercept will be described, it should be understood that the present invention is not limited for use with these services.

According to one aspect of the invention it is realized that either of the Provider Backbone Bridge (PBB) and Provider Backbone Transport (PBT) protocols can be used in a network to provide location information to services. The Provider Backbone Bridge protocol is described in of Electrical and Electronics Engineers (IEEE) 802.1ah (incorporated herein by reference) and is a protocol that enables service providers to construct bridges across Ethernet networks. The Provider Backbone Transport protocol provides Ethernet tunnels that enable deterministic service delivery with traffic engineering, QoS, resiliency and OAM requirements that service providers demand. A brief description of the evolution and use of Provider Backbone Bridging and Provider Backbone Transport will now be described with regard to FIG. 3.

The Institute (IEEE) 802 standards are a family of IEEE standards dealing with local area networks and metropolitan area networks. The services and protocols specified in IEEE 802 map to the lower two layers (Data Link and Physical) of the seven-layer Open System Interconnect (OSI) networking reference model. In fact, IEEE 802 splits the OSI Data Link Layer into two sub-layers named Logical Link Control (LLC) and Media Access Control. The LLC sub-layer is primarily concerned with multiplexing protocols transmitted over the MAC layer (when transmitting) and de-multiplexing them (when receiving) as well as optionally providing flow control and detection and retransmission of dropped packets, if requested.

The Medium Access Control (MAC) data communication protocol sub-layer corresponds to layer 2 of the seven-layer OSI model data link layer. It provides addressing and channel access control mechanisms that make it possible for several terminals or network nodes to communicate within a multipoint network, typically a local area network (LAN) or metropolitan area network (MAN).

Figure 3:
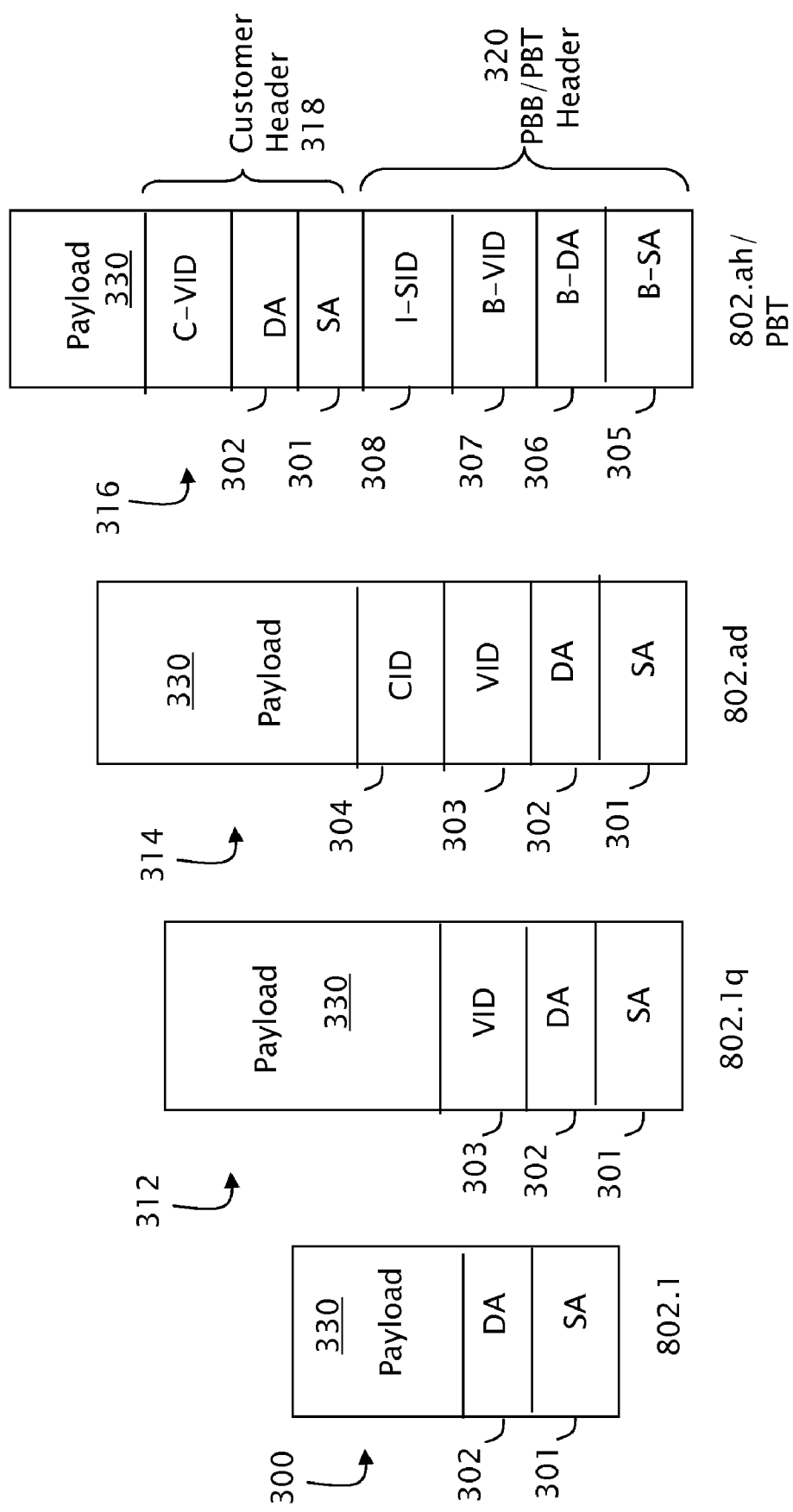
FIG. 3 is a diagram illustrating the layered architecture of a Provider Backbone Bridge (PBB) Network.

The MAC layer provides an addressing mechanism called physical address or MAC address. This is a unique serial number assigned to each network adapter, making it possible to deliver data packets to a destination within a sub-network. The Ethernet thus uses a flat addressing structure. FIG. 3 illustrates several fields of an 802.1 packet 300, which includes a source MAC address 301, a destination MAC address 302 and payload 330.

In order to provide differentiated services on the Ethernet 802.1Q introduced support for Virtual LANs (VLANs). Each VLAN is identified by a Q tag (VID 303) which identifies a logical partitioning of the network to service different communities of interest. VLANs add hierarchy to the flat Ethernet address structure. An 802.1Q packet 310 is shown in FIG. 3.

MAC Bridges were introduced to delivering connectivity services to more end users over a shared Ethernet structure that covers greater distances. MAC Bridges, described in 802.1ad, incorporates a new Q tag (customer ID 304) that allows service providers to deliver tags to identify individual customer networks. An exemplary 802.1ad packet 312 is shown in FIG. 3. 802.1ad packets are also referred to as Q in Q packets, stacked VLAN packets and Provider Bridge packets.

Although Provider Bridges can differentiate between 4096 customers VLANs, this amount of customer support may be insufficient for large metropolitan and regional networks. IEEE 802.1ah, the Provider Backbone Bridge standard overcomes the shortcomings of 802.1ad by encapsulating a customer MAC header 318 inside a service provider MAC header 320 (also referred to herein as a PBB or PBT header). Instead of using Q-tags to separate customers, a 24 bit Service tag (I-SID 308) in the service MAC header is used, enabling a theoretical maximum of 16 million service instances to be supported.

A similar packet frame structure is used in the Provider Bridge Transport (PBT) protocol, although the PBB/PBT header fields of the packet are interpreted differently by core network elements when forwarding frames in a PBT network.

Figure 1:
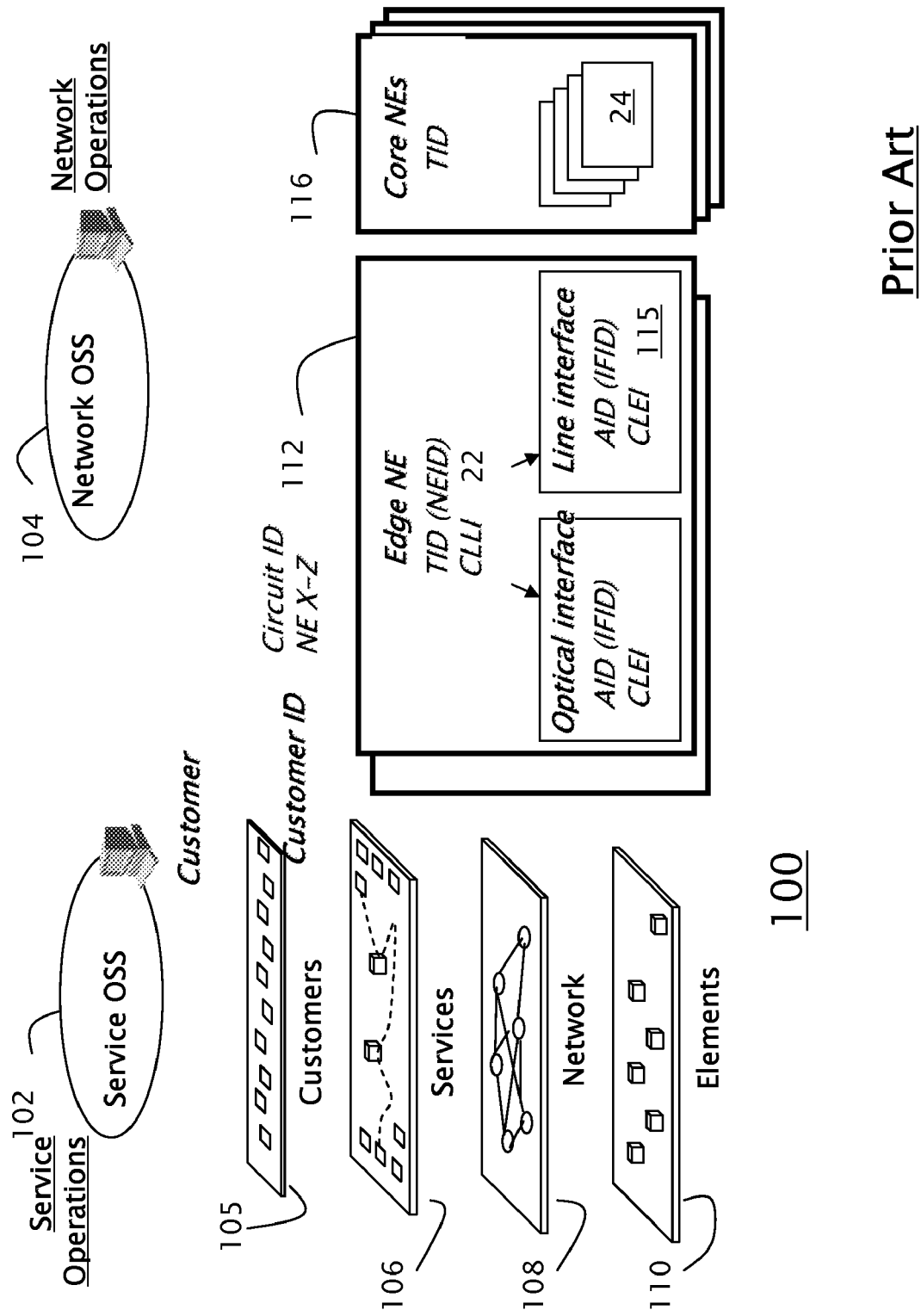
FIG. 1 is a block diagram illustrating several components of a traditional circuit based network.
Figure 4:
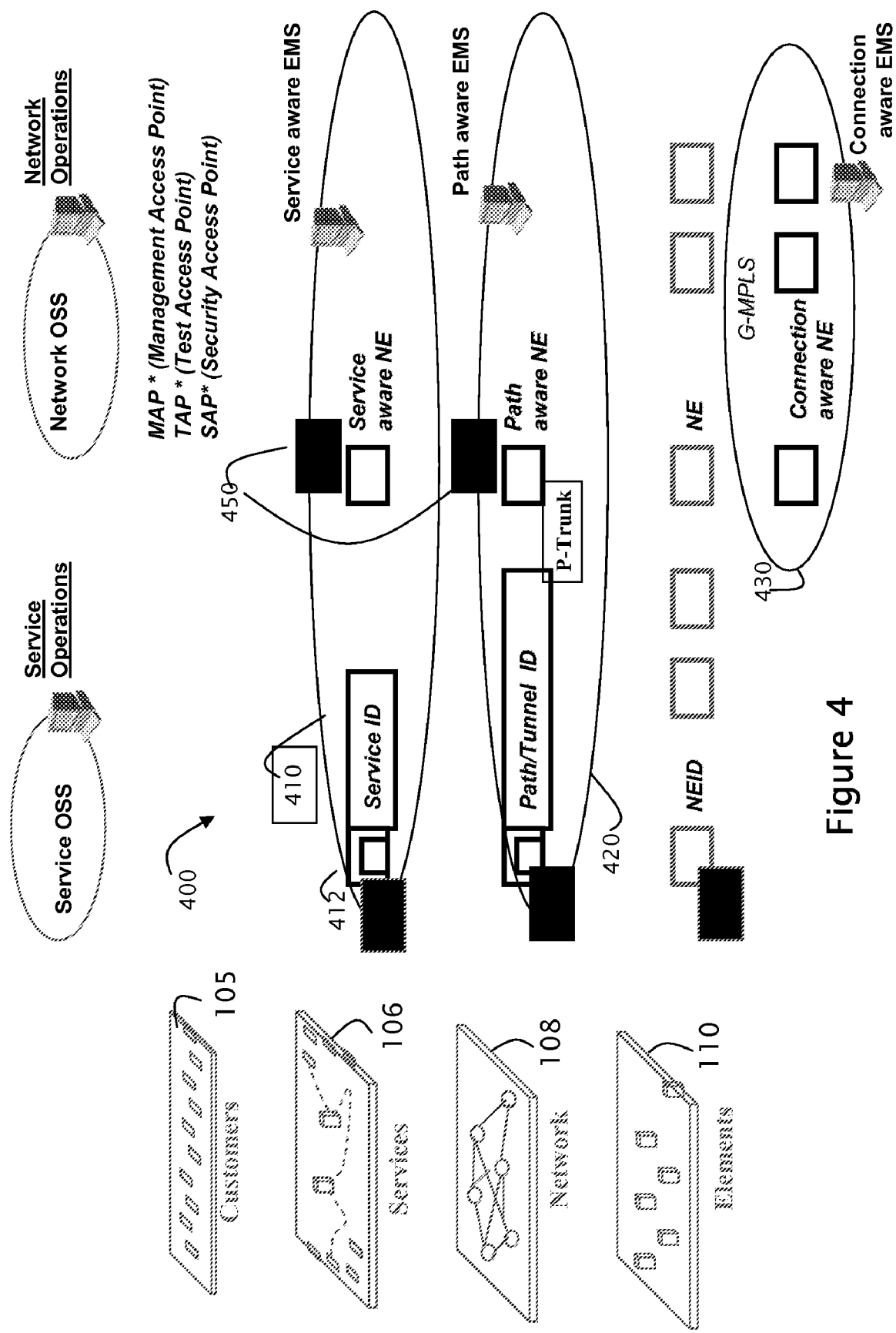
FIG. 4 is a diagram illustrating representative fields of a packet that traverses from a PBB edge node into a PBB core.

In PBB and PBT networks, the overall network is treated as separate service provider and end customer domains. An example of a PBB network 400 is provided in FIG. 4. As in FIG. 1, the service provider network includes customers 105 which request services 106 of the service provider, and the service provider delivers the services over a network 107 which is comprised of a plurality of network elements 108.

However, the method by which services are mapped to network elements and delivered to customers is architected according to the PBB standard. A service provider domain 410 includes a User Network Interface (UNI) 412 through which customers request services. Each service request is assigned a Service Instance Identifier (SID) by the UNI. Thus the SID uniquely associates the service with the customer.

Each service SID is mapped to a network tunnel (B-VID and B-MAC) in the provider domain 420. The tunnel extends between edge devices of the PBB, and is therefore associated with a Bridge Source MAC address and a Bridge Destination MAC address. In this specification the combination of the Bridge Source MAC address and Bridge Destination MAC address shall be referred to hereinafter as the B-MAC address. In the core, one or more connection aware elements 430 monitor the network to track the relationships between SIDs and B-VIDs.

During establishment of the tunnel, the network OSS of the edge device populates tables that associate the network tunnel ID with the B-VID and B-MAC Source and Destination address. In addition information related to the particular customer requesting the service, including the Attachment Identifier (AID)/Interface Identifier (IFID) on which the request is received, the Common Language Location Identifier and Common Language Equipment Identifier is stored at the edge device. In one embodiment, the group of network elements which are traversed by the tunnel is referred to as the end to end facility in support of the logical services (SID).

Thus it can be seen that by implementing PBB or PBT in a network, the edge device includes databases that are able to relate customer locations to a particular service and PBB tunnel. Core devices include functionality for mapping SIDs to tunnels (facilities) and for extracting the B_VID and B-MAC address from a PBB header to identify the edge node associated with the source of a packet. As a result, the origin of any packet in the core can readily be determined, and in turn the location of the client that originated the packet can be obtained. This location information may be provided to services such as emergency 911 services and lawful intercept services.

Figure 5:
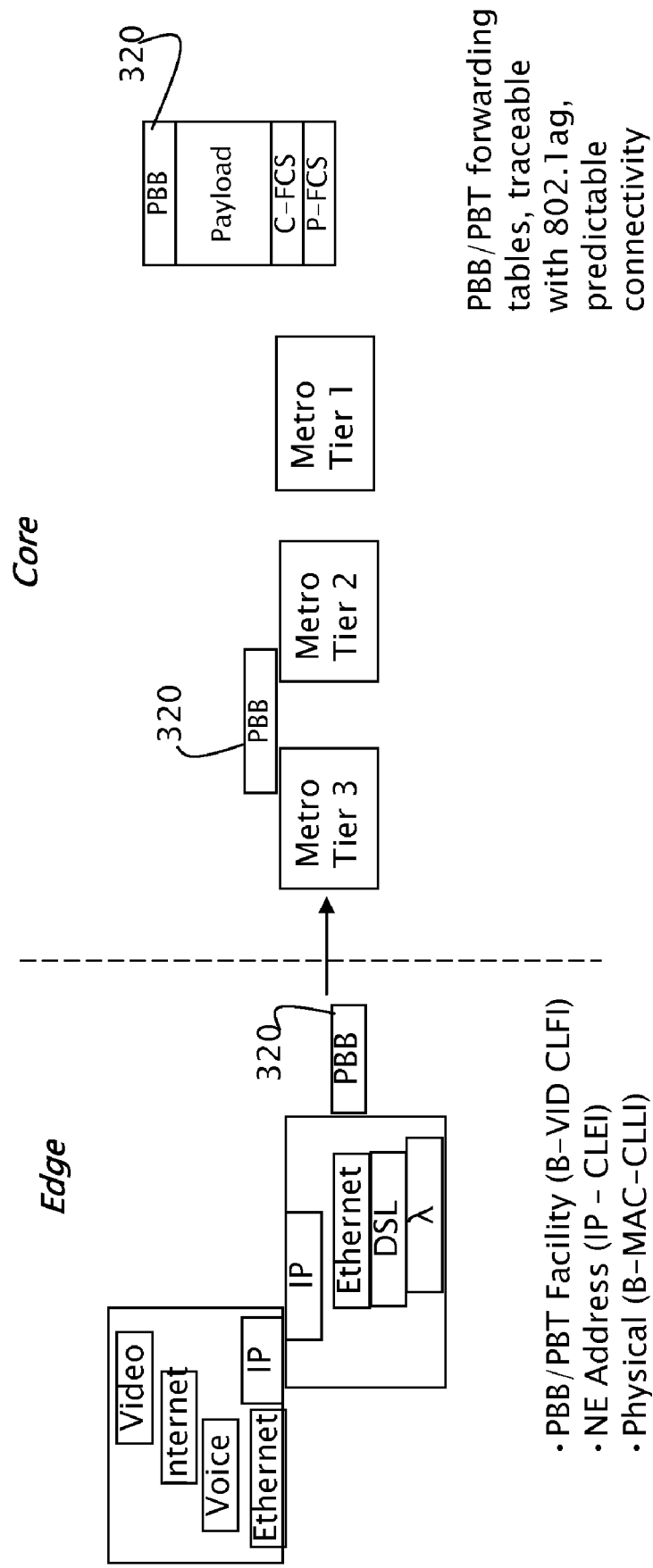
FIG. 5 is a diagram illustrating the traversal of PBB location information from the edge to the core.

FIG. 5 is a block diagram that illustrates the flow of a PBB/PBT packet from an edge to the core. In contrast to the packet flow of FIG. 2B, it can be seen that the PBB/PBT header remains intact as it traverses through the core. The present invention utilizes the PBB/PBT header to make client location information available to services in the core.

Figure 6A:
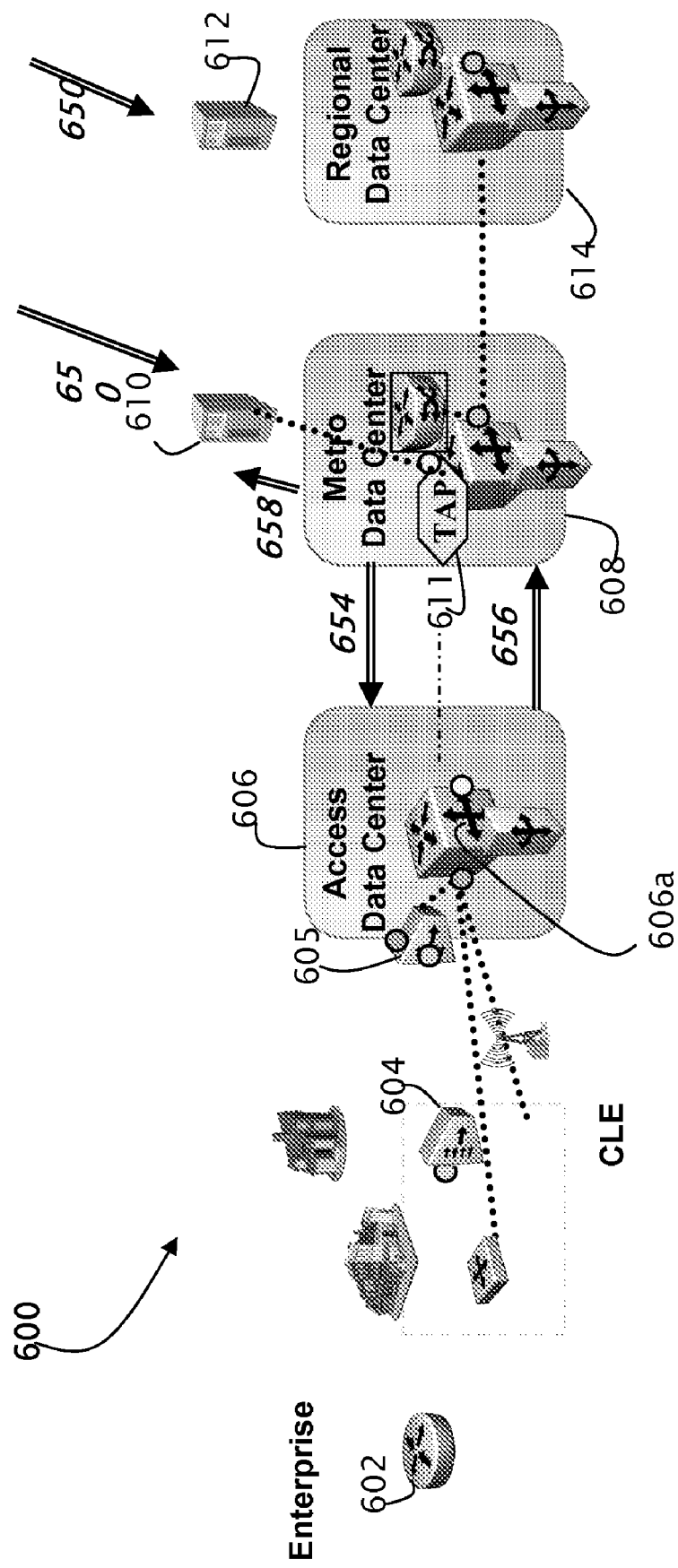

For example, FIGS. 6A and 6B are respective block and flow diagrams that together illustrate information flow through a PBB/PBT core following receipt of a 911 by an emergency service provider. The double line directional arrows of FIG. 6A correspond to steps that are recited in 6B.

A representative network 600 in which the present invention may advantageously be used to provide client location information includes a customer router 602 which routes to a VLAN (CTAG) and inserts CTAG on Egress and a Digital Subscriber Line Access Multiplexers (DSLAMs) 604 and 605. A DSLAM is a network device, usually at a telephone company central office, that receives signals from multiple customer Digital Subscriber Line (DSL) connections and puts the signals on a high-speed backbone line using multiplexing techniques. Depending on the product, DSLAM multiplexers connect DSL lines with some combination of asynchronous transfer mode (ATM), frame relay, or Internet Protocol networks.

DSLAM 605 or Ethernet Switch (606a) is part of Access Data Center 606 which forwards packets from LANS into the core using one of the Provider Backbone Bridge (PBB) or Provider Backbone Transport protocols (PBT). Each service request is forwarded through a User Network Interface (UNI) of the Access Data Center and assigned a Service Identifier (SID). BTAG, BMAC and Service ID, can be associated with NE ID and Location ID (CLLI) of the Access Data Center. The Access Data Center also maintains information mapping the SID to the port of the DSLAM or Ethernet Switch which received the request for service to further assist in customer location.

Packets from the Access Data Center are then forwarded to the Metro Data Center 508 and Regional Data center 614 using the B-VID/B-MAC trunks. In one embodiment, the metro data center comprises a switch, and includes a Test Access Point (TAP) 611 for monitoring traffic that traverses the switch and capturing SID and B-VID/B-MAC mappings. The regional data center may be further coupled to a variety of other networks, including the Public Switched Telephone Network (PSTN), Internet, a Virtual Private Network (VPN), etc. A local voice server 612 and local voice gateway 614 may be coupled to the regional and metro data centers.

FIG. 6B is a flow diagram which illustrates exemplary steps that may be performed by a connection aware network device in a PBB network. At step 650 the network device receives a notification of an emergency service request, such as a 911 call from a local voice server 16 or voice gateway 614. The communication includes a customer identifier such as an SID or a telephone number which can be mapped to an SID for that customer. At step 652, once the SID is obtained the device can identify the tunnel/facility and B-MAC source and destination addresses associated with the SID. The device accesses the edge device to retrieve location information, including the CLII and CLEI associated with the customer at step 654. At step 658 the location information is returned to the emergency management system for handling.

Figure 7A:
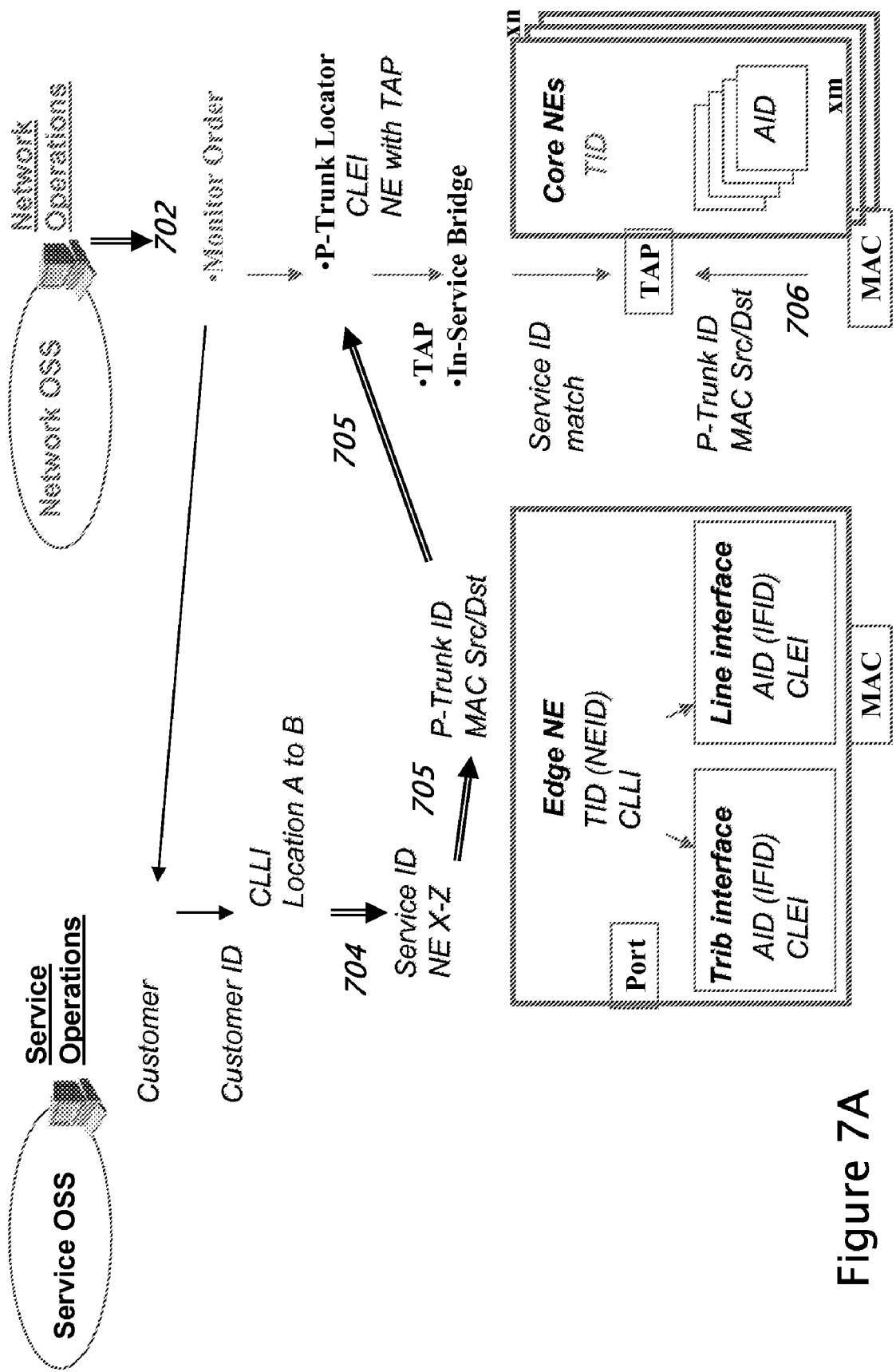
FIGS. 7A and 7B are respective block and flow diagrams provided to illustrate steps and information flow during the location of tap points for obtaining information associated with a client to support lawful intercept services.
Figure 7B:
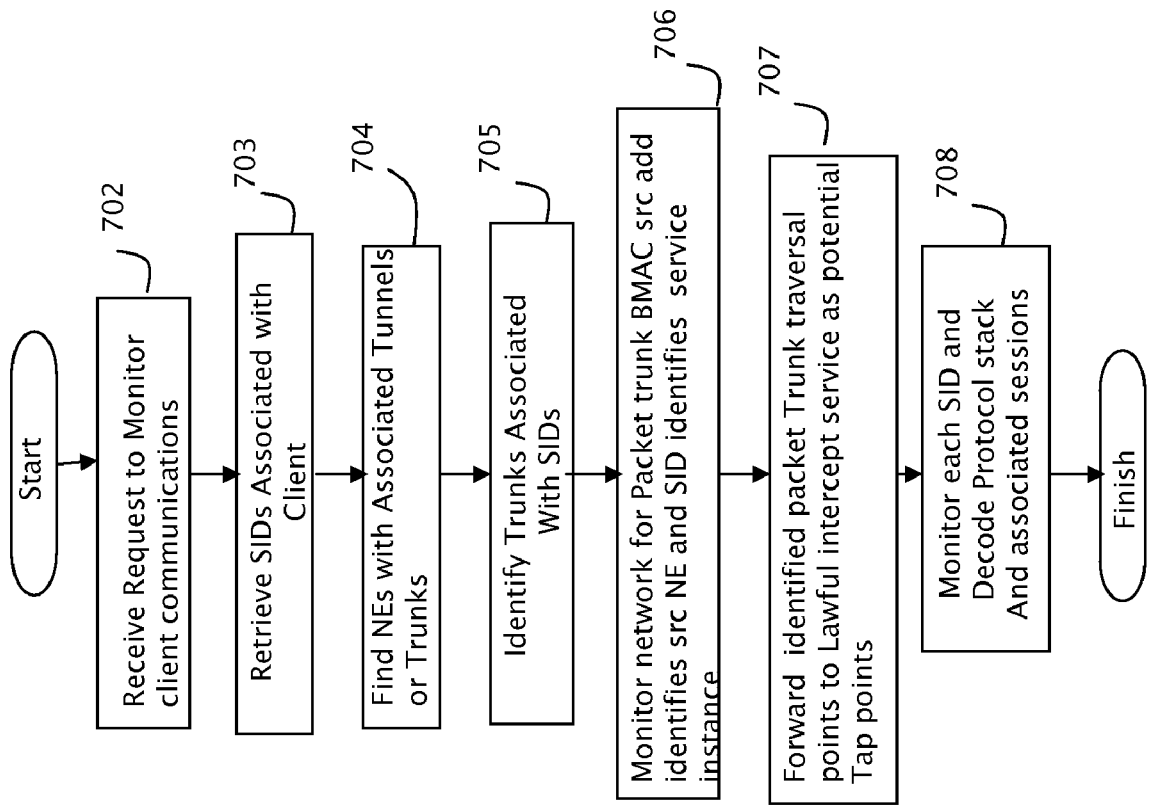

Referring now to FIGS. 7A and 7B, a process of identifying equipment associated with a particular customer for lawful intercept monitoring will now be described. FIG. 7A illustrates exemplary edge tables 720 and core tables 740 that may be provided in network devices that utilize the PBB/PBT protocols. For example, edge table 720 stores, for each trunk of the edge device, the CLLI and CLEI information associated with the trunk. Because the trunk is associated with the SID, and the SID is uniquely associated with the client request, the CLLI and CLEI associated with the trunk provide location information for the client that issued the request. Each core NE stores Attachment Identifiers (AID) for each trunk, thereby allowing the path of the facility to be traced through the core.

A process of identifying network equipment for placing taps to perform lawful intercept of client communications will now be described with regard to FIG. 7B. The steps of FIG. 7B are also represented in 7A by like numerals and double lined arrows.

At step 702 a lawful intercept monitor request is received by a core device. The monitor request includes a client identifier. At step 702 the service provider uses the client identifier to extract a number of service identifiers (SIDs) associated with the client. At step 704 the service provider identifies the tunnels that are associated with the SIDs of the client. Once the tunnels are identified, at step 706 the network can be monitored for packets that include the tunnel identifiers and SIDs associated with the client; any network element that is part of the facility of the client (and is therefore traversed by the tunnel) is a potential candidate for tapping. In one embodiment, the available tap points are forwarded to law enforcement for further processing.

Accordingly a method and apparatus has been shown and described which enables location information associated with a client to easily be obtained by a service provider in a packet-based network. The location information may be the location of the client itself, or may be location information associated with a device comprising a facility established by the client. Location information associated with the client may be provided to services such as emergency services to facilitate fast dispatch of resources to assist the client. Location information associated with facility devices of the client may be used to facilitate lawful interception of client communications. In one embodiment, the location information is obtained using information included in one of a Provider Backbone Bridge (PBB) or Provider Backbone Transport (PBT) packet.

Having described various embodiments of the invention, it will be appreciated that many of the above figures are flow-chart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem The above description and figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software running on a computer, or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A method of locating a point of interest in a packet based network includes the steps of:
    determining, by one or more network devices, a service identifier associated with the point of interest; and
    using mapping information that associates the service identifier with tunnels and network identifiers, including source address, connectivity and destination address, in one of a Provider Backbone Bridge (PBB) or Provider Backbone Transport (PBT) network to locate the point of interest in the packet based network, the mapping information being included in a PBB header of a packet, the PBB header including:
    a bridge source Media Access Control (MAC) address;
    a bridge destination MAC address; and
    the service identifier.

2. The method of claim 1 wherein the step of determining the service identifier occurs in response to a request to monitor a client associated with the service identifier, and wherein the method further includes the steps of:
    determining a tunnel identifier associated with the service identifier; and
    monitoring a plurality of devices in the packet based network to identify a set of devices traversed by the tunnel, where the location of the point of interest is at a device traversed by the tunnel.

3. The method of claim 1 wherein the step of receiving the service identifier occurs in response to a request by a service associated with a client, the location of the client being the point of interest, and the method further including the steps of:
    identifying an end point of a tunnel associated with the service identifier;
    determining an address of the end point of the tunnel;
    retrieving location information for the client from the end point of the tunnel; and
    returning the location information to the service.

4. A method of determining a location of a client requesting a service from a service provider of a packet-based network includes the steps of:
    receiving, by one or more network devices, a service request, the service request comprising a Provider Backbone Bridge (PBB) header, the PBB header comprising
    a bridge source Media Access Control (MAC) address
    a bridge destination MAC address, and
    a service identifier (SID) associated with the client; and
    retrieving location information for the client based on the bridge source MAC address of the PBB header and the service identifier of the PBB header; and
    returning the location information to an E911 service for the client.

5. The method of claim 4 wherein the packet based network is a Provider Bridge Backbone (PBB) or Provider Backbone Transport (PBT) network, and wherein the PBB header comprises a service provider portion and a client portion.

6. The method of claim 4 wherein the PBB header includes a tunnel address associated with the service identifier.

7. The method of claim 4 wherein the location information includes one of a Common Language Location Identifier or GPS location co-ordinates associated with the client.

8. The method of claim 4 wherein the location information includes a Common Language Equipment Identifier or IP node equipment address associated with the edge device.

9. The method of claim 4 wherein the location information includes interface information associating the client to an edge device.

10. A method implemented by a connection aware network device in a Provider Backbone Bridge (PBB) packet-based network, the method comprising:
    monitoring, by the connection aware network device, Provider Backbone Bridge (PBB) headers of packets that traverse the connection aware network device, a PBB header having a bridge source Media Access Control (MAC) address, a bridge destination MAC address, and a service identifier (SID);
    associating service identifiers and tunnel identifiers provided in the PBB headers of packets that traverse the connection aware network device; and
    in response to receipt of a request to locate a client, determining a service identifier associated with the client and retrieving the bridge source MAC address of an edge node associated with the client; and
    accessing the edge node to retrieve location information associated with the client and responding to the request by returning the location information associated with the client.

11. The method of claim 10 wherein each of the PBB headers further comprises a service provider header portion and a client header portion.

12. The method of claim 10 wherein the location information includes Common Language Location Identifier or UPS location co-ordinates associated with the edge device.

13. The method of claim 10 wherein the location information includes Common Equipment Location Information or IP node equipment address associated with the edge device.

14. The method of claim 10 wherein the location information includes interface information associating the client to the edge device.

15. A method implemented by a User Network Interface (UNI) of an edge device coupled to a packet based network core, the method comprising:
    observing Provider Backbone Bridge (PBB) headers comprising a bridge source Media Access Control (MAC) address, a bridge destination MAC address, and a service identifier (SID);
    storing, for each tunnel which the UNI edge device is an end-point, interface information for a client associated with the end-point, a tunnel being defined by the bridge source MAC address and the bridge destination MAC address, the interface information including client location information based on the bridge source MAC address and SID of a PBB header; and
    providing the interface information for the client to a requesting service.

16. The method of claim 15 further comprising a Common Language Location Identifier (CLLI) or GPS location co-ordinates, and wherein the edge device includes means for providing the CLLI or GPS to the requesting service.

17. The method of claim 15 further comprising a one of a Common Equipment Location Identifier (CLEI) and an IP node equipment address and wherein the edge device includes means for providing the CLEI to the requesting service.

18. A method of identifying, at a test access point (TAP) of a data center, a location of at least one network device that is associated with a client communication in a packet-based network includes the steps of:

receiving, at the TAP, a request to monitor a client:
identifying at least one service identifier associated with the client;
identifying at least one tunnel associated with the service identifier, the tunnel being defined by a bridge source Media Access Control (MAC) address and a bridge destination MAC address, the bridge source MAC address and the bridge destination MAC address being contained in a Provider Backbone Bridge (PBB) header of a packet originating from the client; and
monitoring a plurality of network devices in the packet-based network to detect a traversal of the packets using the at least one tunnel through the plurality of network devices including identifying a set of network devices traversed by the tunnel based on the PBB headers of the packets.

19. The method of claim 18, wherein the step of monitoring includes the step of monitoring Provider Bridge Backbone (PBB) packets, extracting PBB headers and comparing tunnel identifiers including the PBB headers against an identifier of the at least one tunnel to determine a match.

20. The method of claim 18, wherein the step of monitoring includes the step of monitoring Provider Bridge Transport (PBT) packets, extracting PBB headers and comparing tunnel identifiers including the PBB headers against an identifier of the at least one tunnel to determine a match.

21. The method of claim 18 further including the step of, responsive to the determination of a match, forwarding attachment interface information associated with the at least one tunnel to a lawful intercept service.

22. A method implemented by an Access Data Center in a packet-based network, the method comprising:
monitoring received packet traffic to detect a traversal of the packets associated with a particular tunnel, and comparing a tunnel identifier in a header of received Provider Backbone Bridge (PBB) packets against an identifier of the particular tunnel to detect a match, a tunnel being identified by a bridge source Media Access Control (MAC) address and a bridge destination MAC address contained in a PBB header of a received PBB packet; and
forwarding attachment information associated with a received packet having a tunnel identifier that matches the identifier of the particular tunnel to a lawful intercept service.

* * * * *